United States Patent
Girondi (10) Patent No.: US 12,060,817 B2
(45) Date of Patent: Aug. 13, 2024

(54) BLOW-BY FILTRATION ASSEMBLY WITH SHAFT COMPRISING OUTFLOW PORTION

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 380 days.

(21) Appl. No.: 17/632,746

(22) PCT Filed: Jul. 28, 2020

(86) PCT No.: PCT/IB2020/057114
§ 371 (c)(1),
(2) Date: Feb. 3, 2022

(87) PCT Pub. No.: WO2021/024092
PCT Pub. Date: Feb. 11, 2021

(65) Prior Publication Data
US 2022/0290591 A1 Sep. 15, 2022

(30) Foreign Application Priority Data
Aug. 7, 2019 (IT) .................. 102019000014283

(51) Int. Cl.
*F01M 13/04* (2006.01)
*B01D 46/00* (2022.01)
(Continued)

(52) U.S. Cl.
CPC ......... *F01M 13/04* (2013.01); *B01D 46/0049* (2013.01); *B01D 46/0056* (2013.01);
(Continued)

(58) Field of Classification Search
CPC ............... B01D 46/0056; B01D 45/12; F01M 2013/0422; F01M 2013/0438; F01M 11/08; F01M 13/00; B04B 5/005
(Continued)

(56) References Cited

U.S. PATENT DOCUMENTS 5,716,423 A 2/1998 Krul et al.
8,794,222 B2 * 8/2014 Schwandt ............ F01M 13/022
123/573

(Continued)

FOREIGN PATENT DOCUMENTS

EP 1 344 559 A1 9/2003
FR 2 622 469 A1 5/1989
WO 2017/189516 A1 11/2017

OTHER PUBLICATIONS

International Search Report and Written Opinion of the International Searching Authority for International Patent Application No. PCT/IB2020/057114 mailed Nov. 23, 2020, 9 pages.
(Continued)

*Primary Examiner* — Long T Tran
*Assistant Examiner* — James J Kim
(74) *Attorney, Agent, or Firm* — Merchant & Gould P.C.

(57) ABSTRACT

A blow-by gas filtration assembly an axis and includes a support body including a filtration chamber, an inlet mouth of the blow-by gases to be filtered, and an outlet mouth of the filtered blow-by gases. The filtration assembly includes a hollow, cylindrical filter group having a central chamber traversable radially from the outside to the inside by blow-by gases, a control drive operatively connected to the filter group to control it in rotation and a shaft, for support and control, extending along the axis defining internally an air duct through which the filtered blow-by gases flow. The shaft includes a filter portion on which the filter group is mounted, a control portion operatively connected to the control drive and an outflow portion axially positioned between the filter portion and the control portion including at least one outflow window through which the filtered blow-by gases flow.

19 Claims, 8 Drawing Sheets

(51) Int. Cl.
    *B01D 46/26*     (2006.01)
    *B01D 46/44*     (2006.01)
(52) U.S. Cl.
    CPC ............. *B01D 46/26* (2013.01); *B01D 46/44*
            (2013.01); *F01M 2013/0438* (2013.01)
(58) Field of Classification Search
    USPC .......................................................... 55/400
    See application file for complete search history.

(56)             References Cited

U.S. PATENT DOCUMENTS

2018/0104633 A1*  4/2018  Bonne .................... F01M 13/04
2019/0136728 A1*  5/2019  Barreteau .............. B01D 45/14
2019/0210039 A1*  7/2019  Kuhn ........................ B04B 7/16

OTHER PUBLICATIONS

Italian Search Report for Italian Patent Application No. 102019000014283 mailed May 20, 2020, 2 pages.

* cited by examiner

BLOW-BY FILTRATION ASSEMBLY WITH SHAFT COMPRISING OUTFLOW PORTION

This application is a National Stage Application of PCT/IB2020/057114, filed 28 Jul. 2020, which claims benefit of Serial No. 102019000014283, filed 7 Aug. 2019 in Italy, and which applications are incorporated herein by reference. To the extent appropriate, a claim of priority is made to each of the above-disclosed applications.

FIELD OF APPLICATION

The present invention relates to a blow-by gas filtration assembly.

In particular, the blow-by gas filtration assembly of the present invention is fluidly connectable to the crankcase ventilation circuit of an internal combustion engine system inside of a vehicle to receive blow-by gases (from said crankcase) and filter from them the suspended particles contained therein.

Specifically, "blow-by gas" means oil vapours vented from the crankcase of an internal combustion engine during its operation. In particular, said blow-by gases have a composition similar to that of exhaust gases and are generated by combustion of the air/fuel mixture in the combustion chamber. Instead of reaching the exhaust gas emission circuit, these gases leak into the lower portion of the crankcase, passing alongside the cylinders and bringing carbon particles and oil drops with them. In the present discussion, for the sake of simplicity, blow-by gases are considered to consist of air and suspended particles; said suspended particles comprise oil droplets and/or carbonaceous particulates.

STATE OF THE ART

In the state of the art, solutions of filtration assemblies that it is fluidly connectable to the crankcase and suitable for venting it from blow-by gases are known of.

Specifically, blow-by gas filtration assembly solutions which separate unwanted suspended particles from the aforesaid blow-by gases are known of, comprising a filter group having such purpose.

In the state of the art, a plurality of embodiments of filtration assemblies comprising a filter group comprising a porous-type filter medium, driven in rotation by a specific control drive such that the suspended particles are separated from the air both by passing through the porous material and by the action of the centrifugal force are known of.

Such embodiments typically present a complex shape especially in the fluidic connection methods between the filter group and the crankcase ventilation circuit. Specifically, the known embodiments are such as to have inlet mouths and outlet mouths connectable to said crankcase ventilation circuit positioned in obligatory regions. In the known solutions, this causes particular problems for the blow-by gas filtration assembly, such as, and above all, conditioning the positioning and geometry of the filter group and the control drive. In addition, in the known solutions, this means that the known blow-by gas filtration assemblies prove to have a large footprint.

Solution According to the Invention

In the aforesaid state of the art the need is therefore strongly felt to have a blow-by gas filtration assembly that solves such problems.

The purpose of the present invention is to provide a new embodiment of a blow-by gas filtration assembly with an innovative shape and fluidic arrangement of the various components comprising it.

DESCRIPTION OF THE DRAWINGS

Further characteristics and advantages of the invention will, in any case, be evident from the description given below of its preferred embodiments, made by way of a non-limiting example with reference to the appended drawings, wherein:

FIGS. 4a and 4b respectively show two cross-section views of the components as in FIG. 4, along two angularly different cross-section planes;

DETAILED DESCRIPTION

With reference to the appended drawings, reference numeral 1 denotes a blow-by gas filtration assembly suitable for performing a filtration/separation action on particles (liquid and/or solid) suspended in the gas stream.

Said blow-by gas filtration assembly 1 is fluidly connectable to a crankcase ventilation circuit of an internal combustion engine of a vehicle to receive blow-by gases and filter from them be suspended particles contained therein returning a stream of clean gas (i.e. filtered) to other vehicle systems such as, for example, to the engine air intake circuit communicating with the combustion chamber of the internal combustion engine.

Preferably, said blow-by gas filtration assembly 1 can be directly assembled to the crankcase of an internal combustion engine of a vehicle. In particular, the present invention is not limited to this feature; the blow-by gas filtration assembly 1 could be configured as a stand-alone device comprising respective inlet and outlet ports communicating respectively with the crankcase, for receiving blow-by gases to be filtered, and with the air intake circuit, for recirculating the gas stream filtered of solid and liquid particles towards the combustion chamber.

According to the present invention, the filtration assembly 1 comprises an X-X axis with respect to which the components described below extend or are positioned.

According to a preferred embodiment, the blow-by gas filtration assembly 1 comprises a support body 2. Preferably, the other components of the system are positioned in or on said support body 2, as described extensively below and evident from the exemplary figures attached.

In particular, the support body 2 comprises a filtration chamber 20 in which filtration/separation operations of the blow-by gases take place. The filtration chamber 20 is therefore fluidly connected to the crankcase ventilation circuit of an internal combustion engine of a vehicle to receive dirty blow-by gases, i.e. comprising suspended particles (solid and/or liquid), and emit clean blow-by gases, i.e. cleaned of suspended particles, into the engine air intake system.

According to a preferred embodiment, the support body 2 comprises respective blow-by gas inlets and outlets.

Preferably, the support body 2 comprises an inlet mouth 21 fluidically connected with the crankcase ventilation circuit of a vehicle to receive the blow-by gases to be filtered. Preferably, said inlet mouth is made radially, spaced apart from the X-X axis, for example substantially parallel thereto. Preferably, said inlet mouth is made on the side wall of the support body 2. Preferably, said inlet mouth is made on the wall of the support body 2 defining the filtration chamber 20.

In addition, preferably, the support body 2 comprises an outlet mouth 22. Said outlet mouth 22 is radially spaced apart from the X-X axis, for example substantially parallel thereto.

According to a preferred embodiment, said outlet mouth 22 is made on the coupling flange of the support body 2 to the internal combustion engine crankcase. Preferably, the outlet mouth 22 and the inlet mouth 21 are mutually axially parallel.

Furthermore, according to a preferred embodiment, the support body 2 comprises a main body 210 and an auxiliary body 220 mutually engageable as amply described below and as shown by way of example in the attached figures.

According to the present invention, the blow-by gas filtration assembly 1 comprises a filter group 3, specifically suitable for performing said filtration/separation operations of the particles suspended in the blow-by gases. Said filter group 3 is positionable and operates in the filtration chamber 20.

The filter group 3 extends along the X-X axis having a hollow cylindrical shape, comprising, in fact, a central chamber 300.

The filter group 3 can be crossed radially by blow-by gases.

According to the present invention, the filter group 3 can be crossed by blow-by gases in a radial direction from the outside towards the inside.

Preferably, the inlet mouth 21 is radially facing the filter group 3. According to a preferred embodiment, the inlet mouth is radially facing the outer surface of the filter group 3.

Preferably, the outlet mouth 22 is, in turn, substantially radially facing the filter group 3.

In other words, the filter group 3 identifies, in the filtration chamber 20, a dirty side in which there are blow-by gases to filter and a clean side in which there are filtered blow-by gases. The inlet mouth 21 is fluidically connected with said dirty side, the outlet mouth 22 is fluidically connected with said clean side.

According to a preferred embodiment, the filter group 3 comprises a filter medium 30. The filter medium 30, which can be crossed radially comprises a non-woven fabric pleated in the form of a star or a porous cylindrical septum.

Moreover, according to a preferred embodiment, the filter group 3 comprises a first filter plate 31 and a second filter plate 32 mutually arranged at the ends of the filter medium 30.

In addition, according to a preferred embodiment, the filter group 3 comprises a central structure 33 which is housed inside the filter medium 30 and joins the two filter plates 31, 32, so that the filter plates 31, 32 are integrally connected in rotation. Preferably, said central structure 33 has a plurality of through openings suitable to allow the passage of the fluid being filtered.

According to a preferred embodiment said central structure 33 is made in one piece with the first filter plate 31.

In addition, according to a preferred embodiment, the filter group 3 comprises an outer structure 34 which surrounds the filter medium 30 on the outside and joins the two filter plates 31, 32. Preferably, said central structure 33 has a plurality of through openings suitable to allow the passage of the fluid being filtered.

According to a preferred embodiment said central structure 33 is made in one piece with the second filter plate 32.

As shown in the attached figures, the central chamber 300 extends through the filter plates 31, 32 surrounded by the filter medium 30. According to a preferred embodiment, the central chamber 300 extends through respective through openings 318, 328 made on the filter plates 31, 32. Preferably, said openings 318, 328 are concentric to the X-X axis, like the central chamber 300.

According to the present invention, moreover, the filtration assembly 1 comprises a control drive 4 operatively connected to the filter group 3 to command it in rotation about the X-X axis.

Preferably, said control drive 4 is of the electrical type or of the mechanical type or of the electromechanical type.

According to a preferred embodiment, the control drive 4 comprises an electric motor group 40 comprising a rotor 41 and a stator 42. The actuation of the stator 42 results in the rotation of the rotor 41. According to a preferred embodiment, the electric motor group 40 is of the electric type, preferably brushless.

According to a preferred embodiment, the rotor comprises one or more elements in ferromagnetic material arranged in the shape of a toroid.

According to the present invention, the blow-by gas filtration assembly 1 comprises a support and control shaft 5.

Such shaft 5 extends along the X-X axis and is specially designed to be operatively connected to the filter group 3 and the control drive 4.

Preferably, the shaft 5 is hollow in at least a portion thereof.

According to a preferred embodiment, the shaft 5 is made as a single component.

According to an alternative embodiment, the shaft is a hollow body composed of two or more parts mechanically connectable to each other (e.g. by welding, mechanical couplings, screws or the like) reversibly or irreversibly so as to form a single component the constituent parts of which rotate synchronously upon command by the control drive 4.

Preferably, the shaft 5 comprises at least one air duct 50 through which the filtered blow-by gases flow.

According to the present invention, the shaft 5 comprises a control portion 54 engaged to the control drive 4 and a filter portion 53 on which the filter group 3 is housed. Preferably, said rotor 41 is housed on the control portion 54. In particular, the rotor 41 and the filter group 3 are mounted integrally to the shaft 5 respectively to the control portion 54 and to the filter portion 53 in such a way that a controlled rotation of the rotor 41 corresponds to a rotation of the shaft 5 and thus of the filter group 3. In particular, in the present description, "integrally" means that the control drive 4 and the filter group 3 are mechanically connected to the shaft 5 to rotate in unison (or synchronously).

Preferably, said air duct 50 extends inside the filter portion 53 so as to be fluidically connected to the central chamber 300. Preferably, the air duct 50 is housed, and fluidically connected with the filter group 3, in the clean side of the filtration chamber.

The coupling methods of the filter group 3 with the shaft are not limiting for the purposes of the present invention, except for the characteristics described below.

Figure 1:
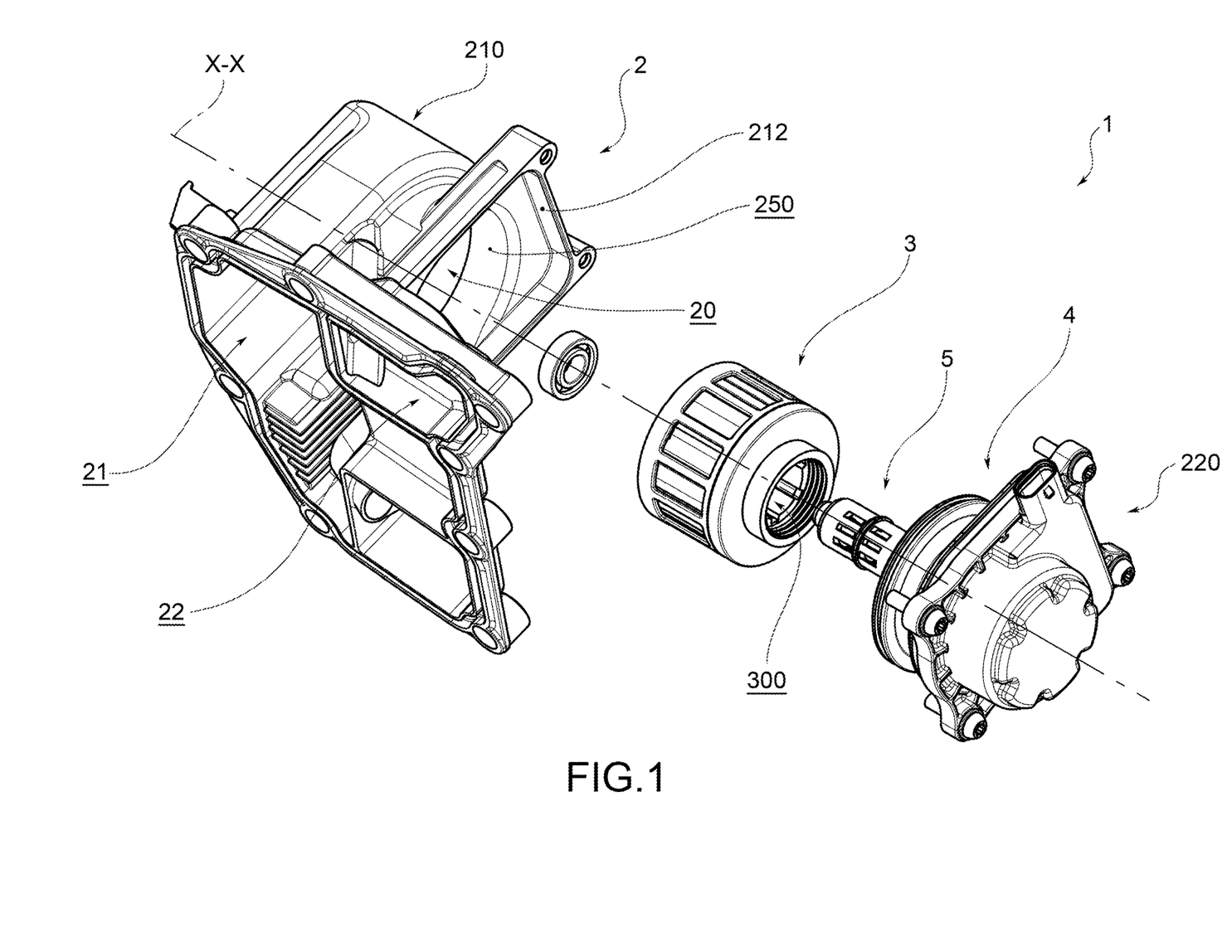
FIG. 1 shows a perspective view in separate parts of the blow-by gas filtration assembly according to the present invention, according to a preferred embodiment.
Figure 1A:
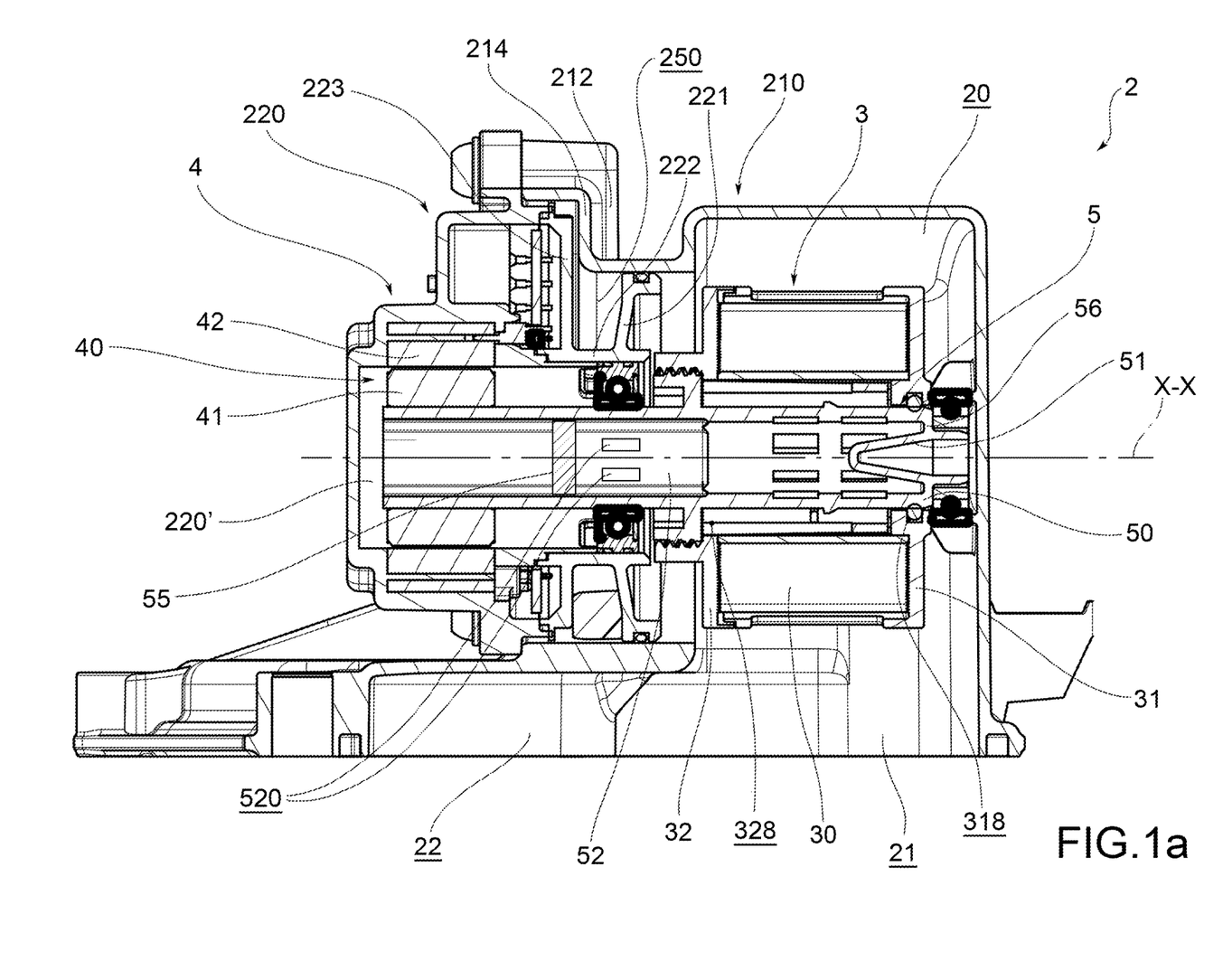
FIG. 1a shows a cross-section view of the blow-by gas filtration assembly as in FIG. 1 in an assembled configuration.

According to a preferred embodiment, such as that shown by way of example in FIGS. 1 and 1a, the shaft 5 and the filter group 3 are mutually engageable by screwing, by means of specially provided threaded portions.

Figure 2:
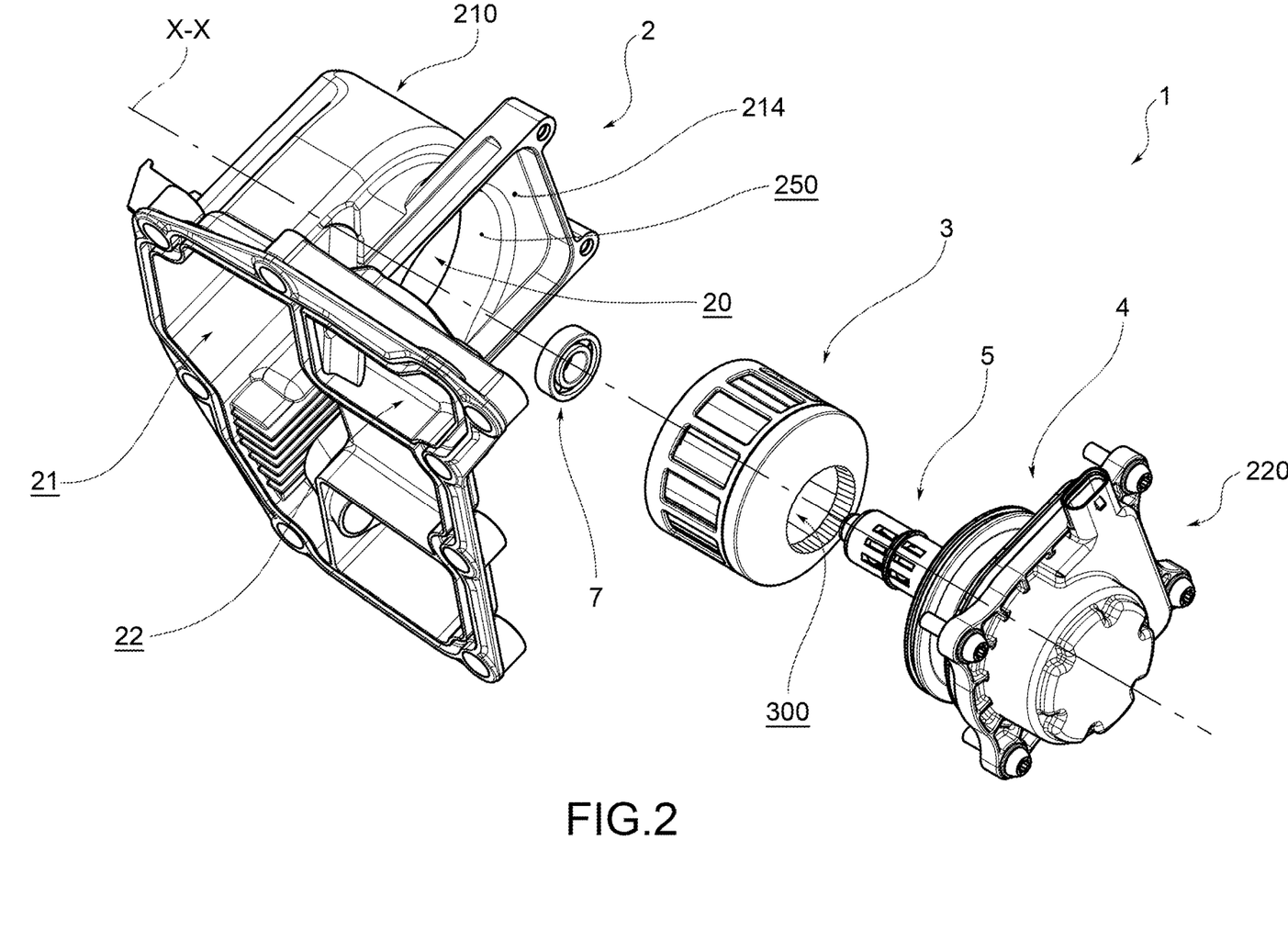
FIG. 2 shows a perspective view in separate parts of the blow-by gas filtration assembly according to the present invention, according to a further preferred embodiment.
Figure 2A:
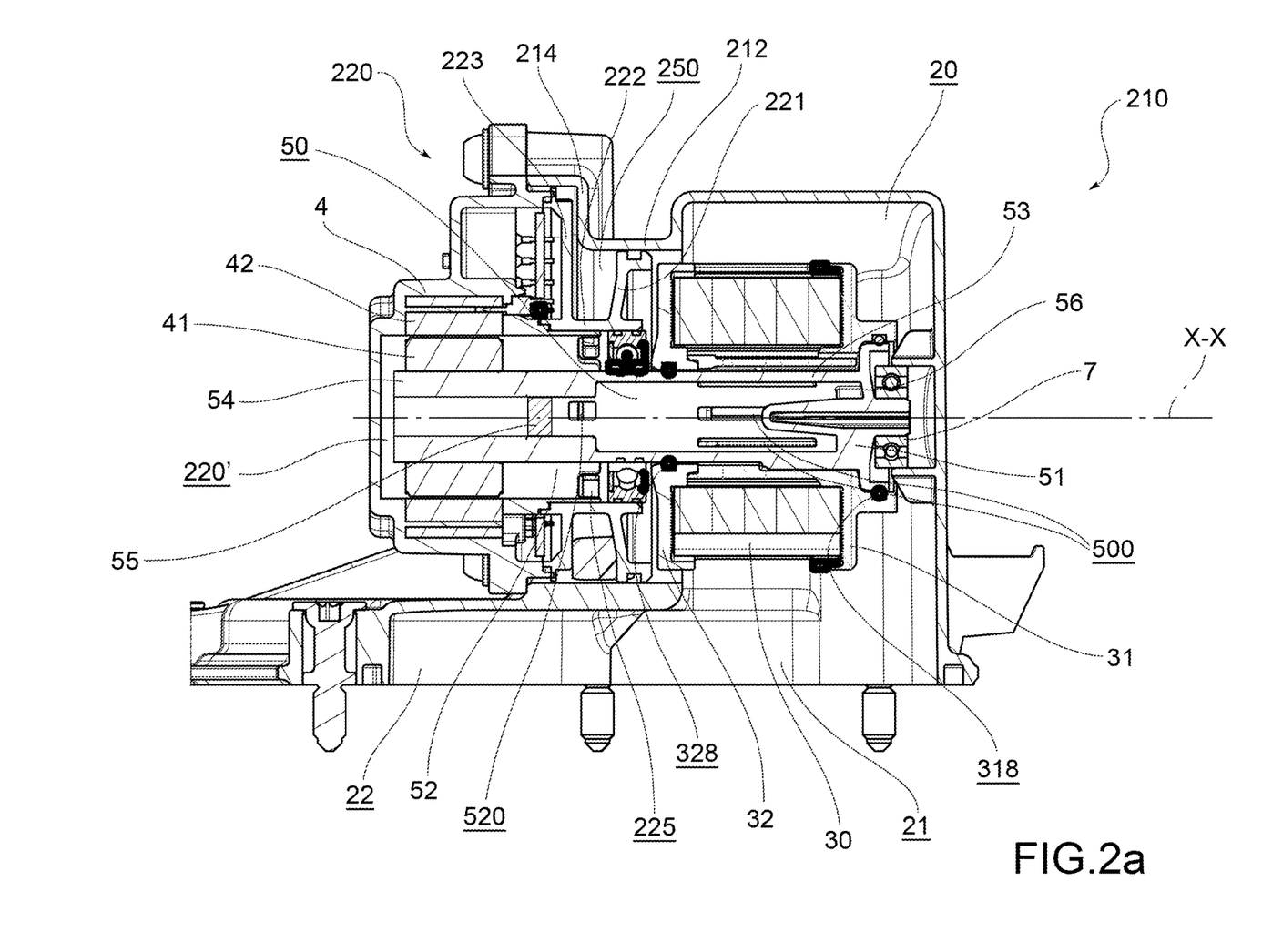
FIG. 2a shows a cross-section view of the blow-by gas filtration assembly as in FIG. 2 in an assembled configuration.
Figure 3:
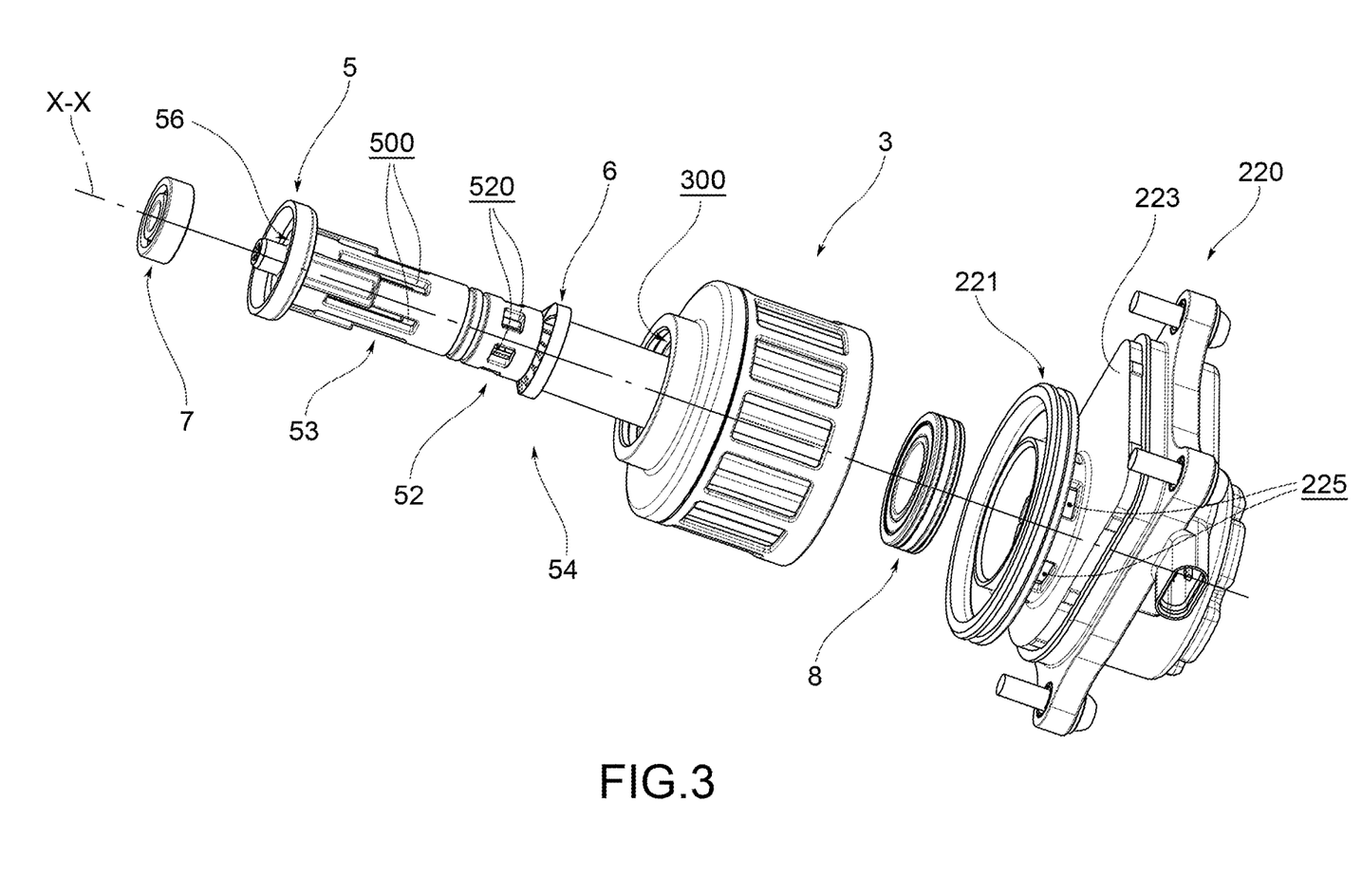
FIG. 3 shows an enlarged view in separate parts of some components of the blow-by gas filtration assembly shown in FIG. 2.
Figure 4:
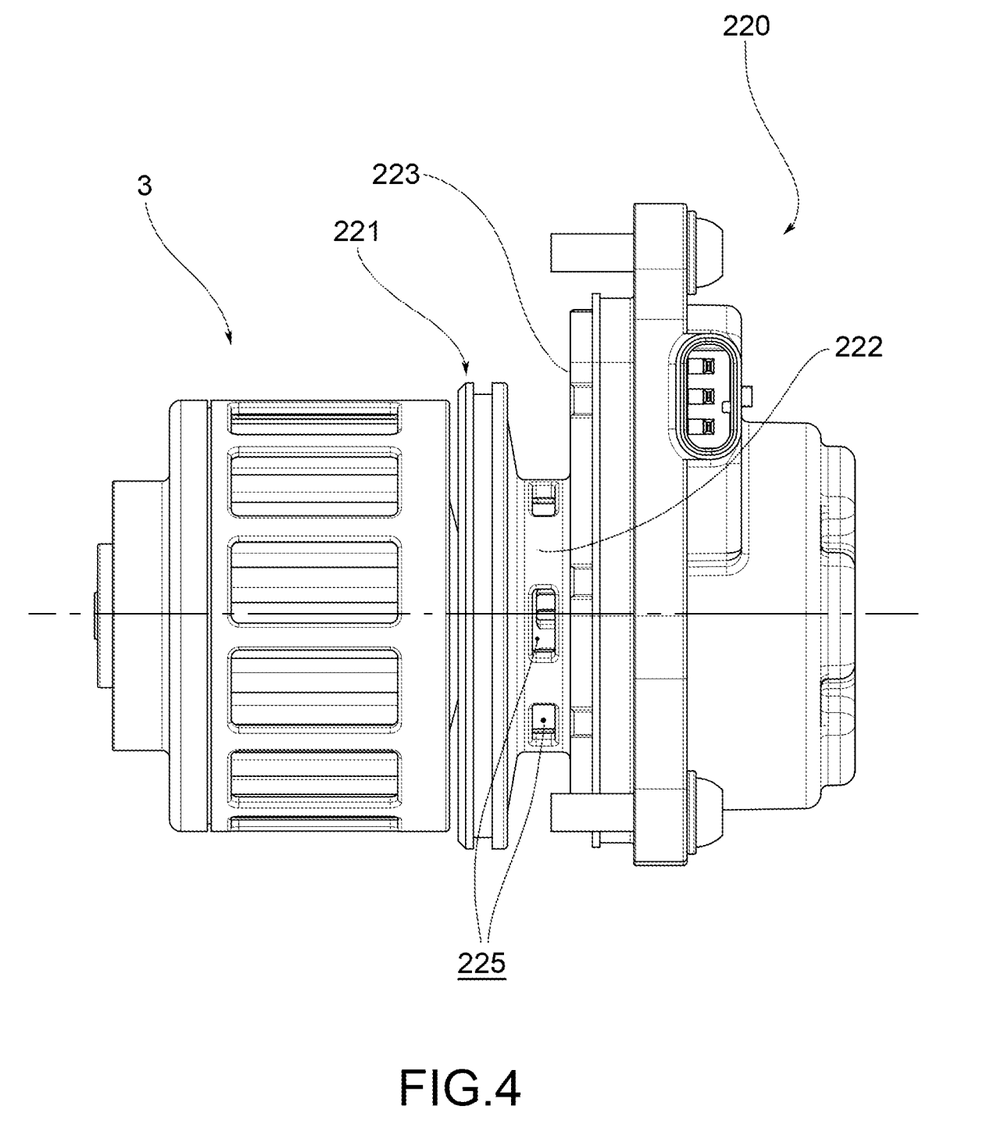
FIG. 4 is a side view of the components as in FIG. 3, in an assembled configuration.
Figure 4A:
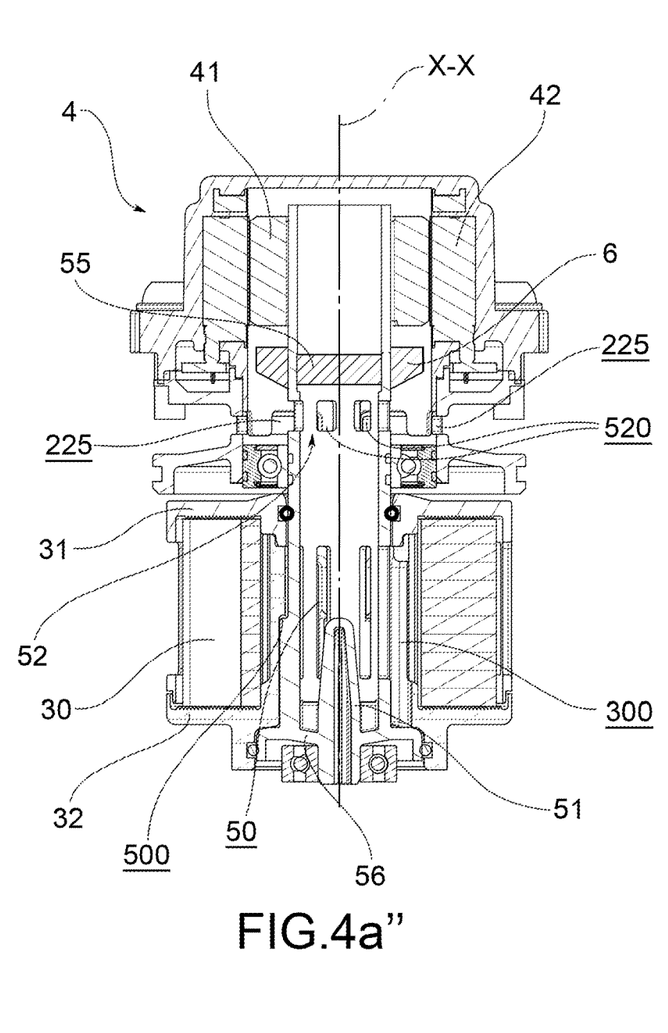
Figure 5:
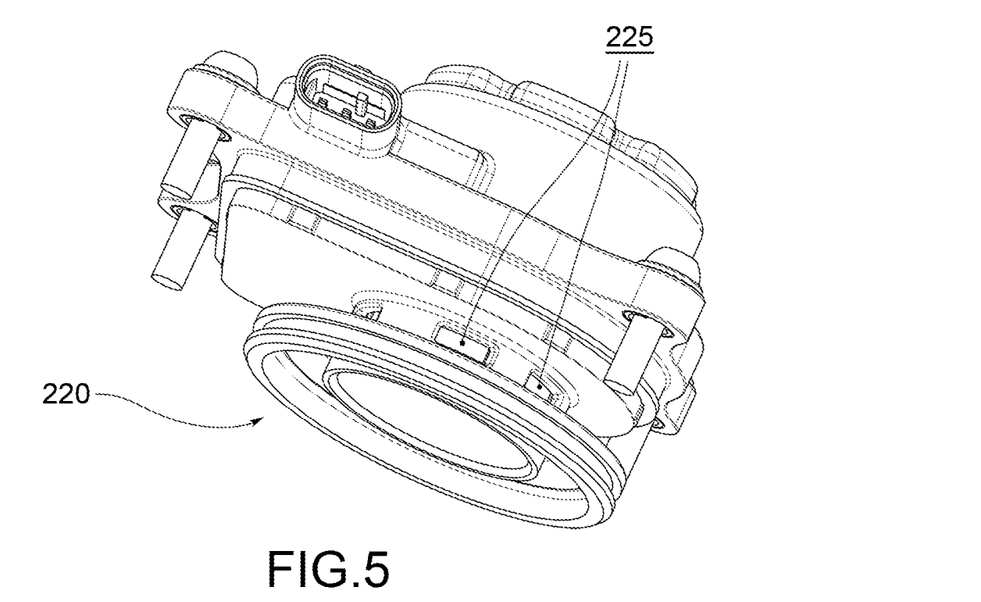
FIG. 5 shows a perspective view of an auxiliary body comprised in the blow-by gas filtration assembly according to a preferred embodiment.
Figure 5A:
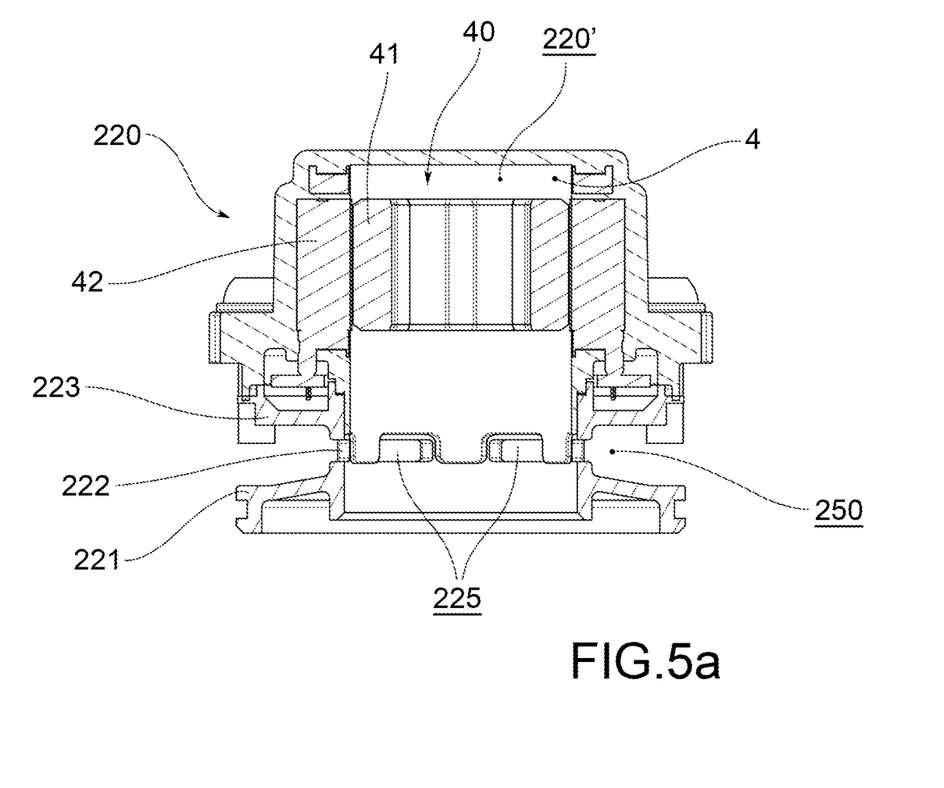
FIG. 5a show a cross-section view of FIG. 5.

According to an embodiment variant, such as that shown by way of example in FIGS. 2 and 2a, the shaft 5 and the filter group 3 are mutually engageable by means of a shape coupling.

According to other further embodiment variants, the shaft 5 and the filter group 3 are mutually engageable by being specially shaped and providing for the insertion of special insert or threaded components.

According to a preferred embodiment, the filter group 3 sealingly engages the shaft 5 in two axially separate sealing regions.

Preferably, said two sealing regions are located near the first filter plate 31 and a second filter plate 32. Preferably, at said sealing regions the filter group and the shaft are mutually specially shaped to sealingly engage each other and/or the filter group has specially shaped gasket elements.

According to a preferred embodiment, the shaft 5 comprises air slits 500, axially positioned between the two sealing regions. Said air slits 500 are suitable to place in fluidic communication the air duct 50 and the central chamber 300.

According to a preferred embodiment, there are a plurality of slits 500 and they are positioned mutually angularly equidistant. According to the present invention, in addition, the shaft comprises an outflow portion 52 axially positioned between the filter portion 53 and the control portion 54. In other words, axially along the X-X axis, the shaft comprises the filter portion 53, the outflow portion 52, and the control portion 54.

According to the present invention, the outflow portion 52 comprises at least one outflow window 520 through which filtered blow-by gases flow towards the outlet mouth 22.

According to a preferred embodiment, the outflow portion 52 comprises a plurality of outflow windows 520, arranged annularly around the X-X axis.

According to the present invention, therefore, the filtered blow-by gases flow in the air duct 50 until they reach at least one outflow window 520 through which the blow-by gases flow outside the shaft 5 towards the outlet mouth 22.

Preferably, the outflow portion 52 is the outlet of the air duct 50.

According to a preferred embodiment, the air duct 50 extends for an axial stretch, at least partially between said slits 500 and the at least one outflow window 520. In other words, the air duct 50 allows the circulation of filtered blow-by gases from the central chamber 300 directed towards the outlet mouth 22; preferably, then the blow-by gases radially pass through the at least one slit 500, flow axially into the air duct 50 along the X-X axis and flow radially out through the at least one outflow window 520.

According to a preferred embodiment, the shaft 5 comprises a closing wall 55, inside the air duct 50 suitable to close said air duct 50 to force the outflow of the filtered blow-by gases through the at least one outflow window 520.

According to a preferred embodiment, the closing wall 55 is positioned at the control portion 54, proximal to the outflow portion 52.

Preferably, said closing wall 55 is shaped to facilitate the outflow of blow-by gases towards the at least one outflow window 520.

Furthermore, according to a preferred embodiment, the shaft 5 comprises a bottom wall 56 positioned at the filter portion 53 at an axial end thereof. Preferably, said bottom wall 56 closes the axial end of the air duct 50 at the filter group 3, preventing the circulation of filtered blow-by gases through said end of the shaft 5.

Moreover, according to a preferred embodiment, the shaft 5 comprises a diffuser element 51, housed inside the air duct 50, positioned at the filter portion 53 at an axial end thereof, preferably tapered, suitable to convey the filtered blow-by gases towards the outflow portion 52.

According to the present invention, the shaft 5 receives radially (through at least one slit 500) the blow-by gases filtered by the filter group in an axial stretch thereof corresponding to the filter portion 53, and radially releases the blow-by gases into a further axial stretch, corresponding to the outflow portion 52 (through the at least one outflow window 520).

According to a preferred embodiment, the blow-by gas filtration assembly 1 also comprises a deflector element 6 positioned on the shaft 5 in the control portion 54 suitable to rotate together with said control portion 54 to perform a pushing action on the filtered blow-by gases in output from the at least one outflow window 520 towards the outlet mouth 22.

Preferably, the deflector element 6 is positioned outside the shaft 5.

Preferably, the deflector element 6 is a substantially annular element that can be fitted axially onto the shaft 5. Preferably, the deflector element 6 is couplable to the shaft 5 by means of a mutual shape coupling.

Preferably, the deflector element 6 is positioned on the shaft 5 at the control portion 54 axially proximal to the outflow portion 52.

Preferably, the deflector element 6 is a propeller element comprising one or more walls or blades extending orthogonally to the X-X axis.

According to a preferred embodiment, the deflector element 6 is designed to assist the outflow of blow-by gases in output from the shaft 5 towards the outlet mouth 22. The deflector element 6 prevents the blow-by gases in output from the shaft 5 towards the outlet mouth 22 from randomly flowing into the support body 2. In particular, the deflector element 6 contributes to minimising the recirculation of blow-by gases in the rotor housing region 42 by ensuring the correct maintenance of the operating gap provided for between the rotor 42 and the stator 41.

As mentioned above, the support body 2 comprises a main body 210 and an auxiliary body 220 mutually sealingly engageable along the X-X axis.

Preferably, the coupling between the main body 210 and an auxiliary body 220 hermetically delimits the filtration chamber 20. Preferably, said filtration chamber 20 is housed in the main body 210 closed at one axial end by the auxiliary body 220.

Preferably, both the inlet mouth 21 and the outlet mouth 22 are comprised in the main body 210.

According to a preferred embodiment, the main body 210 and the auxiliary body 220 in the reciprocal coupling further delimit an outflow chamber 250 fluidically connected to the outflow portion 52 of the shaft 5 and to the outlet mouth of the blow-by gases 22. Said outflow chamber 250 is sealingly separated from the filtration chamber 20, fluidically connected to the clean side of the filtration chamber by means of the shaft 5. Preferably, said outflow chamber 250 is fluidically connected to the clean side of the filtration chamber by means of the at least one outflow window 520.

According to a preferred form of filtration assembly, the outflow chamber 250 is at least partially housed in the main body 210.

Preferably, the outflow chamber 250 extends at least partially around the X-X axis. Preferably, the outflow chamber 250 has an annular extension.

According to a preferred embodiment, the outflow chamber 250 is radially delimited by a collar wall 222 of the auxiliary body 220 placed in a region proximal to the X-X axis and by a housing wall 212 comprised in the main body 210 placed in a region distal from the X-X axis.

Moreover, according to a preferred embodiment, the outflow chamber 250 is axially delimited by a bottom wall 221 and by a top wall 223 extending radially relative to the X-X axis.

Moreover, according to a preferred embodiment, the outflow chamber 250 is axially delimited by a bottom wall 221 and by a top wall 223 comprised in the auxiliary body 220, extending radially relative to the X-X axis starting from the collar wall 222.

According to a preferred embodiment, the outflow chamber 250 is fluidically connected to the outflow portion 52 by means of at least one body window 225 through which the blow-by gases coming out of the at least one outflow window 520, flow.

Preferably, the collar portion 222 comprises at least one body window 225.

According to a preferred embodiment, the collar portion 222 is annularly facing the shaft 5 at the at least one outflow window 520.

Preferably, therefore, the at least one outflow window 520 and the at least one body window 225 are radially aligned.

According to a preferred embodiment, both the bottom wall 221 and the top wall 223 sealingly engage the main body 210.

Preferably, as shown in the accompanying drawings, the top wall 223 engages the main body 210 in an axial direction. Preferably, proximal to the housing wall 212, the main body 210 comprises an abutment step 214 axially engageable by the secondary body 220.

Preferably, as shown in the accompanying drawings, the bottom wall 221 engages the main body 210 in a radial direction. Preferably, at one radial end thereof, the bottom wall 221 is suitable to house a gasket element.

According to a preferred embodiment, the outflow chamber 250 is shaped so as to facilitate the outflow of the blow-by gases. Preferably, for example, the outflow chamber 250 is radially wider in a region distal from the X-X axis. Preferably, in fact, the bottom wall 221 extends in a specially inclined radial direction, i.e. conically shaped.

According to a preferred embodiment, the shaft extends partially into the main body 210 and partially into the auxiliary body 220.

According to a preferred embodiment, the auxiliary body 220 comprises a stator housing 220' in which the stator 42 is housed.

Preferably, the stator 42 is inserted in the stator housing 220' in an axial direction.

Preferably, the stator 42 is integral with the auxiliary body 220. For example, the auxiliary body 220 integrates the stator 42 internally. Preferably, the stator 42 is co-moulded with the auxiliary body 220.

According to a preferred embodiment, the blow-by gas filtration assembly 1 comprises a first bearing and a second bearing 8 engaged to the shaft 5 to support it to the support body 2.

Preferably, the first bearing 7 engages the filter portion 53 and the main body 210.

Preferably, the second bearing 8 engages the outflow portion 52 and the auxiliary body 220. Preferably, the second bearing is housed on the collar wall 222.

According to a preferred embodiment, the second bearing 8 engages the shaft 5 in an intermediate axial portion between the outflow portion 52 and the filter portion 53 and the auxiliary body. Preferably, the second bearing is housed on the collar wall 222.

Preferably, the second bearing 8 engages the control portion 54 and the auxiliary body 220. Preferably, the second bearing 8 is housed on the collar wall 222.

According to a preferred embodiment, the engagement of the bearings with the shaft and with the respective support body is sealed.

According to a preferred embodiment, the shaft 5 is made of thermoplastic material obtained by means of a single moulding operation.

Preferably, the shaft 5 is made of polyphenylene sulphide (PPS).

Preferably, the shaft 5 is made of a polyphenylene sulphide (PPS) based material.

Preferably, the shaft 5 is made of a polyphenylene sulphide (PPS) based material reinforced with fibreglass (PPS+GF15, PPS+GF30, PPS+GF40).

Preferably, the shaft 5 is made of a nylon-based material (PA, PA 6, PA 6.6 or a mixture thereof).

Preferably, the shaft 5 is made of nylon-based material reinforced with fibreglass. (PA+GF, PA 6.6+GF35, PA 6+PA 6.6+GF 35)

Preferably, the shaft 5 is made of a material comprising a polyamide-based compound (e.g. PPA).

According to a preferred embodiment, the shaft 5 is made of metal. Preferably, the shaft 5 is made of aluminium alloy.

Innovatively, the blow-by gas filtration assembly of the present invention widely fulfils the purpose of the present invention. Innovatively, the blow-by gas filtration assembly presents a new and innovative shape, but above all a new and innovative fluidic arrangement.

Advantageously, the fluidic flow management inside the blow-by gas filtration assembly allows efficient filtration in an extremely compact space.

Advantageously, the blow-by gas filtration assembly has extremely compact dimensions.

Advantageously, the outflow of the filtered blow-by gases follows a substantially radial direction.

Advantageously, the deflector element directs the filtered blow-by gases towards the outlet, speeding up the outflow thereof.

Advantageously, the support body is designed to identify and fluidically separate the filtration chamber from the outflow chamber in a simple and effective manner. Advantageously, the support body comprises the main body and the auxiliary body the mutual engagement of which defines said chambers.

Advantageously, the support body fluidically defines and separates the filtration chamber from the outflow chamber ensuring the correct outflow of the blow-by gases from the inlet mouth towards the outlet mouth minimising the pressure drops associated with the filtration assembly.

Advantageously, the auxiliary body is suitable to contain the control drive. Advantageously, the auxiliary body contains the electric motor group. Advantageously, the stator is embedded, preferably co-moulded, to the auxiliary body.

Advantageously, the auxiliary body is a multifunctional component supporting the electric motor group, comprising the housing seat of the rotor and of the shaft control portion on which the filter group is inserted, as well as comprising the sealing portions used to define and separate the filtration chamber and the outflow chamber as a result of the coupling with the main body.

Advantageously, the auxiliary body supports most of the components included in the assembly, facilitating their insertion inside the filtration chamber, for example in a single operation, simplifying the assembly procedure of the filtration assembly and reducing its production costs.

Advantageously, the deflector element allows the correct operating gap provided for between the rotor and stator to be maintained, avoiding the accumulation of contaminants in said area which could attenuate the transmission of the electromagnetic field from stator and rotor.

Advantageously, the auxiliary body and the main body comprise respective seats for the installation of a support bearing, reducing the number of components needed to ensure the correct rotation of the filter group inside the filtration chamber.

It is clear that a person skilled in the art may make modifications to the blow-by gas filtration assembly so as to satisfy contingent requirements, all contained within the scope of protection as defined by the following claims.

LIST OF REFERENCE NUMBERS 1 blow-by gas filtration assembly
2 support body
20 filtration chamber
21 inlet mouth
22 outlet mouth
210 main body
212 housing wall
214 abutment step
220 auxiliary body
220' stator housing
221 bottom wall
222 collar wall
223 top wall
225 body window
250 outflow chamber
3 filter group
30 filter medium
31 first filter plate
32 second filter plate
318, 328 through openings
33 central structure
34 outer structure
300 central chamber
4 control drive
40 electric motor group
41 rotor
42 stator
5 shaft
50 air duct
500 air slits
51 diffuser element
52 outflow portion
520 outflow window
53 filter portion
54 control portion
55 closing wall
56 bottom wall
6 deflector element
7 first bearing
8 second bearing
X-X rotation axis

The invention claimed is:

1. A blow-by gas filtration assembly which is fluidly connectable to a crankcase ventilation circuit of an internal combustion engine to receive blow-by gases and filter suspended particles contained in the blow-by gases, wherein the filtration assembly has an axis and comprises:
   a support body comprising a filtration chamber extending along said axis, an inlet mouth of the blow-by gases to be filtered and an outlet mouth of the filtered blow-by gases
   a filter group which extends along the axis and has a hollow cylindrical shape having a central cavity which is traversable radially by the blow-by gases from the outside to the inside;
   a control drive operatively connected to the filter group to command the filter group in rotation about the axis and to perform filtration operations;
   a shaft, for support and control, extending along the axis defining internally an air duct through which the filtered blow-by gases flow, wherein the shaft comprises:
      i) a filter portion on which the filter group is mounted;
      ii) a control portion operatively connected to the control drive;
      iii) an outflow portion axially positioned between the filter portion and the control portion, wherein said outflow portion comprises at least one outflow window through which the filtered blow-by gases flow towards the outlet mouth.

2. The blow-by gas filtration assembly according to claim 1, wherein the outflow portion comprises a plurality of outflow windows, arranged annularly around the axis.

3. The blow-by gas filtration assembly according to claim 1, further comprising a deflector element positioned on the shaft in the control portion to rotate together with said control portion to perform a pushing action on the filtered blow-by gases in output from the at least one outflow window towards the outlet mouth.

4. The blow-by gas filtration assembly according to claim 3, wherein said deflector element is a propeller element comprising one or more walls or blades extending orthogonally to the axis.

5. The blow-by gas filtration assembly according to claim 1, wherein the filter group sealingly engages the shaft in two axially distinct sealing regions, wherein the shaft comprises air slits, axially positioned between the two sealing regions, which place the air duct and the central chamber in fluidic communication.

6. The blow-by gas filtration assembly according to claim 1, wherein the shaft comprises a closing wall, inside the air duct, positioned at the control portion proximal to the outflow portion, for closing said air duct to force the outflow of filtered blow-by gases through the at least one outflow window.

7. The blow-by gas filtration assembly according to claim 1, wherein the shaft comprises a diffuser element, inside the air duct, positioned at the filter portion at an axial end thereof.

8. The blow-by gas filtration assembly according to claim 1, wherein the filter group comprises a filter medium, a first filter plate and a second filter plate respectively positioned at ends of the filter medium.

9. The blow-by gas filtration assembly according to claim 1, wherein the control drive comprises an electric motor group comprising a rotor and a stator, wherein the rotor is engaged to the control portion of the shaft.

10. The blow-by gas filtration assembly according to claim 1, wherein the support body comprises a main body and an auxiliary body mutually sealingly engageable along the axis so as to hermetically delimit the filtration chamber, wherein the main body and the auxiliary body in the reciprocal coupling delimit an outflow chamber fluidically connected to the outflow portion of the shaft and to the outlet mouth of the blow-by gases.

11. The blow-by gas filtration assembly according to claim 10, wherein the outflow chamber extends at least partially around the axis, and is radially delimited by a collar wall of the auxiliary body placed in a region proximal to the axis and by a housing wall comprised in the main body placed in a region distal from the axis, wherein the outflow chamber is fluidically connected with the outflow portion by at least one body window through which the blow-by gases flow out of the at least one outflow window.

12. The blow-by gas filtration assembly according to claim 10, wherein the collar portion comprises at least one body window.

13. The blow-by gas filtration assembly according to claim 12, wherein the collar portion is annularly facing the shaft at the at least one outflow window.

14. The blow-by gas filtration assembly according to claim 10, wherein said outflow chamber is axially delimited by a bottom wall and a top wall comprised in the auxiliary body, extending radially with respect to the axis starting from the collar wall.

15. The blow-by gas filtration assembly according to claim 13, wherein the bottom wall and the top wall sealingly engage the main body.

16. The blow-by gas filtration assembly according to claim 9, wherein the auxiliary body comprises a stator housing in which the stator is housed, wherein the stator is inserted into the stator housing in an axial direction, or wherein the auxiliary body integrates the stator therein.

17. The blow-by gas filtration assembly according to claim 1, comprising a first bearing and a second bearing engaged to the shaft to support the shaft to the support body, wherein the first bearing engages the filter portion and the main body and the second bearing engages the outflow portion and the auxiliary body.

18. The blow-by gas filtration assembly according to claim 1, wherein the outlet mouth of the filtered blow-by gases is positioned radially spaced apart from the axis.

19. The blow-by gas filtration assembly according to claim 1, wherein the shaft comprises a diffuser element, inside the air duct, positioned at the filter portion at an axial end thereof, and tapered to convey the filtered blow-by gases to the outflow portion.

* * * * *